US010823545B2

(12) United States Patent
Xue et al.

(10) Patent No.: US 10,823,545 B2
(45) Date of Patent: Nov. 3, 2020

(54) COAXIALITY DETECTING TOOL

(71) Applicant: CITIC Dicastal CO., LTD., Qinhuangdao (CN)

(72) Inventors: Bowen Xue, Qinhuangdao (CN); Haiyi Wang, Qinhuangdao (CN); Huayou Li, Qinhuangdao (CN); Zhanku Wang, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 560 days.

(21) Appl. No.: 15/688,900

(22) Filed: Aug. 29, 2017

(65) Prior Publication Data
US 2018/0335292 A1 Nov. 22, 2018

(30) Foreign Application Priority Data

May 19, 2017 (CN) .......................... 2017 1 0358217

(51) Int. Cl.
G01B 5/25 (2006.01)
G01B 5/252 (2006.01)
G01B 5/28 (2006.01)
B23Q 17/22 (2006.01)
G01B 5/00 (2006.01)
G01B 5/24 (2006.01)

(52) U.S. Cl.
CPC ............. *G01B 5/252* (2013.01); *B23Q 17/22* (2013.01); *G01B 5/0025* (2013.01); *G01B 5/24* (2013.01); *G01B 5/25* (2013.01); *G01B 5/28* (2013.01)

(58) Field of Classification Search
None
See application file for complete search history.

(56) References Cited

U.S. PATENT DOCUMENTS

| 1,607,862 | A | * | 11/1926 | Bath | G01B 5/08 |
| | | | | | 33/544.5 |
| 2,868,154 | A | * | 1/1959 | Norman | B23Q 17/22 |
| | | | | | 116/231 |
| 2,971,261 | A | * | 2/1961 | Buchanan | G01B 5/24 |
| | | | | | 33/429 |
| 4,030,201 | A | * | 6/1977 | Possati | G01B 5/201 |
| | | | | | 33/504 |
| 4,222,173 | A | * | 9/1980 | Hall | G01B 5/25 |
| | | | | | 33/533 |
| 4,383,368 | A | * | 5/1983 | Morawski | G01B 5/252 |
| | | | | | 33/199 R |

(Continued)

*Primary Examiner* — Jill E Culler
(74) *Attorney, Agent, or Firm* — Cooper Legal Group, LLC

(57) ABSTRACT

Disclosed is a coaxiality detecting tool composed of a hexagon flange nut, a measuring column and a detection sleeve. When the coaxiality detecting tool is used, a cone of the measuring column is matched with a cone hole of a detected workpiece, the hexagon flange nut is matched with a threaded column of the measuring column, and the measuring column is fixed on the workpiece; an inner hole of the detection sleeve is matched with a detection column, the conical surface of the detection sleeve is in contact with the orifice of a ΦE hole in the workpiece, whether the whole conical surface is in uniform contact with the orifice of the ΦE hole is observed, and if in uniform contact, the detected coaxiality is qualified, otherwise, the detected coaxiality is unqualified.

3 Claims, 5 Drawing Sheets

(56) References Cited

U.S. PATENT DOCUMENTS

| | | | | |
|---|---|---|---|---|
| 5,182,865 A | * | 2/1993 | Greenslade | G01B 5/252 33/550 |
| 2014/0259717 A1 | * | 9/2014 | Zhang | G01B 5/143 33/543 |

* cited by examiner

COAXIALITY DETECTING TOOL

CROSS-REFERENCE TO RELATED APPLICATIONS

This application is filed based upon and claims priority to Chinese Patent Application No. 201710358217.3, filed on May 19, 2017, the entire contents of which are incorporated herein by reference.

BACKGROUND

In the machining field of automobile parts, some special detection requirements are often encountered, in which it is required to detect the coaxiality of a straight hole relative to a cone hole axis in a clutch starter shell. Each part detected by using three coordinates needs to be clamped, so the efficiency is very low, and a detecting tool which is simple and convenient to use is needed for detecting.

SUMMARY

The disclosure relates to a detecting tool, and specifically, to a detecting tool for detecting the coaxiality of a straight hole in a detected workpiece relative to a cone hole axis.

The disclosure is aimed at providing a coaxiality detecting tool, which can detect the coaxiality of a straight hole in a detected workpiece relative to a cone hole axis.

In order to fulfill the above aim, the disclosure adopts the technical solution: a coaxiality detecting tool is composed of a hexagon flange nut, a measuring column and a detection sleeve, in which the hexagon flange nut is matched with a threaded column; and the detection sleeve is matched with a detection column.

The measuring column includes the threaded column, a cone, a cylinder, the detection column and a guiding cone; the threaded column is on the left of the cone, the cylinder is on the right of the cone, the detection column is on the right of the cylinder, and the guiding cone is on the right of the detection column.

The diameter of an inner hole of the detection sleeve is $\Phi A$, and the tolerance is (0, +0.003) mm; and the runout of the outer conical surface relative to the central axis of the inner hole is 0.005 mm.

The diameter of the detection column is $\Phi B$, $\Phi B = \Phi A - 0.3 + 0.036$) mm, and the tolerance is (0, −0.008) mm; the taper of the cone is C, and the tolerance is ±3'; the coaxiality of the detection column relative to the central axis of the cone (22) is 0.005 mm; and the taper of the guiding cone is 25 degrees.

In practical use, the cone of the measuring column is matched with the cone hole of the detected workpiece, the hexagon flange nut is matched with the threaded column of the measuring column, and the measuring column is fixed on the workpiece; the inner hole of the detection sleeve is matched with the detection column, the conical surface of the detection sleeve is in contact with the orifice of the $\Phi E$ hole in the workpiece, whether the whole conical surface is in uniform contact with the orifice of the $\Phi E$ hole is observed, and if in uniform contact, the detected coaxiality is qualified, otherwise, the detected coaxiality is unqualified.

The coaxiality detecting tool can be used for detecting the coaxiality of the straight hole in the detected workpiece relative to the cone hole axis, and simultaneously has the characteristics of simple structure, high detection precision, safe and stable performance, low manufacturing cost and the like.

Figure 1:
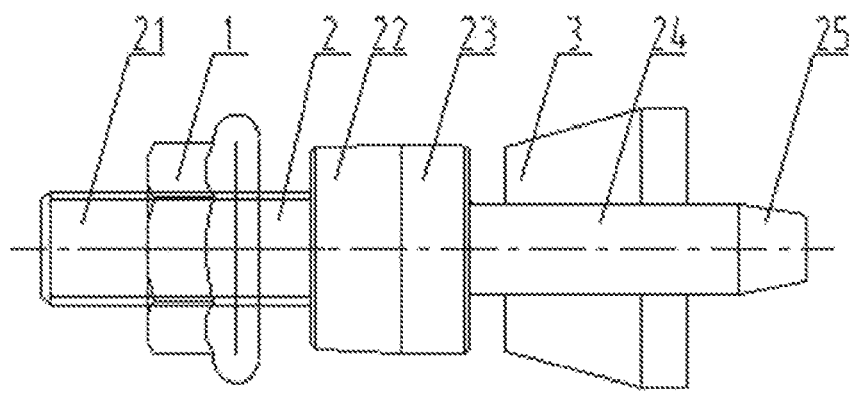
FIG. 1 is a front view of a coaxiality detecting tool of the disclosure.
Figure 2:
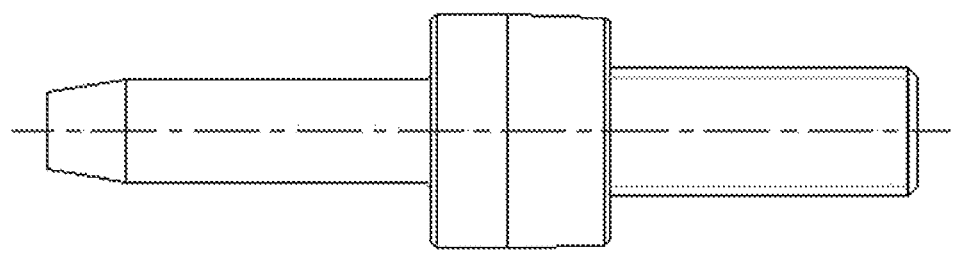
FIG. 2 is a front view of a measuring column of the coaxiality detecting tool of the disclosure.
Figure 3:
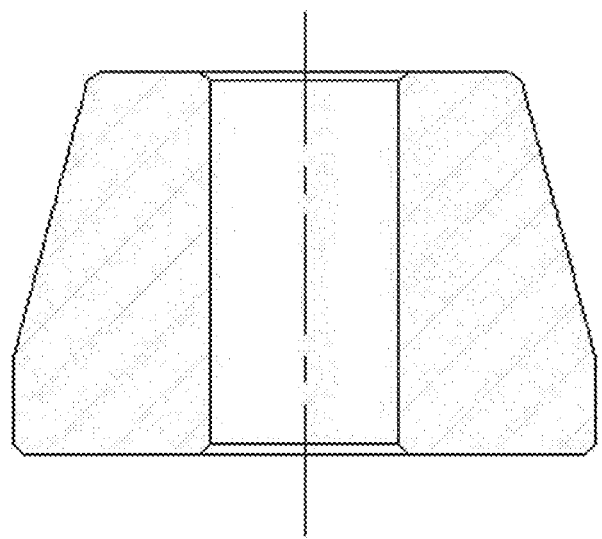
FIG. 3 is a front view of a detection sleeve of the coaxiality detecting tool of the disclosure.
Figure 4:
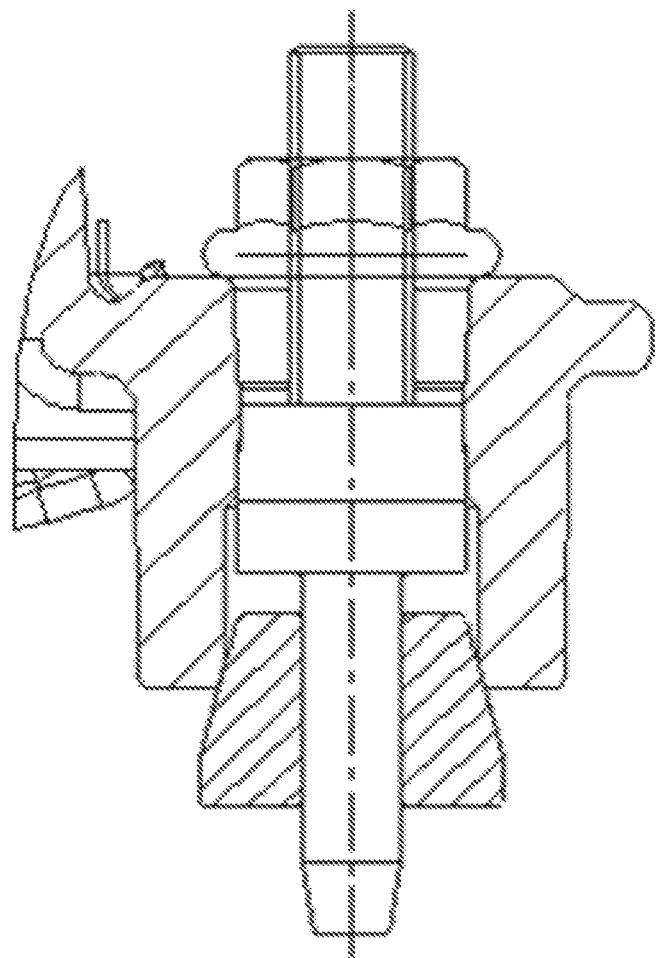
FIG. 4 is a front view when the coaxiality detecting tool of the disclosure measures a workpiece.
Figure 5:
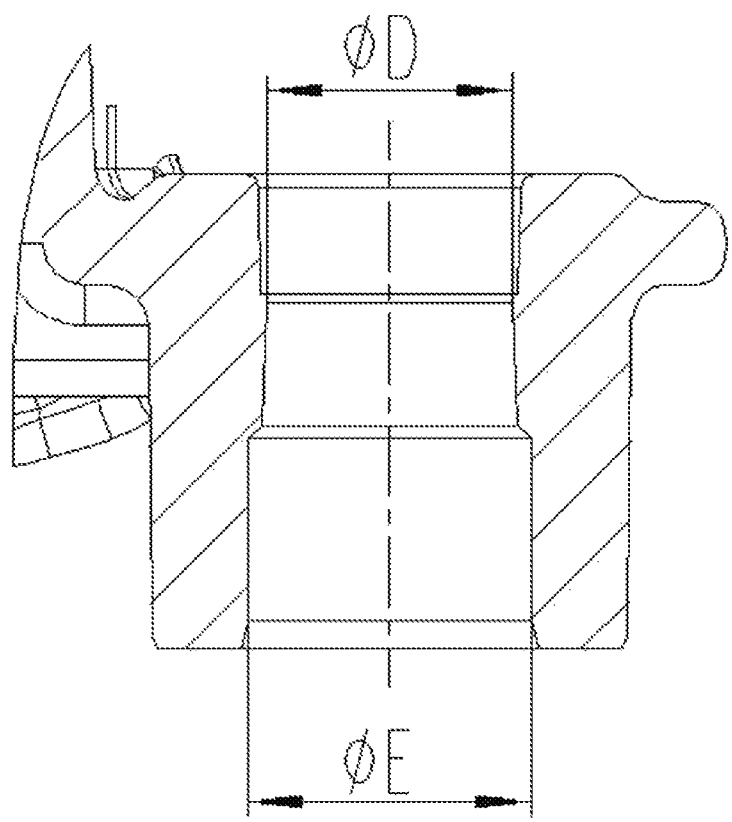
FIG. 5 is a partial front view of the detected workpiece of the disclosure.

In which: 1—hexagon flange nut, 2—measuring column, 3—detection sleeve, 21—threaded column, 22—cone, 23—cylinder, 24—detection column, 25—guiding cone.

DETAILED DESCRIPTION

The details and working conditions of the specific device provided by the disclosure will be described below in combination with the accompanying drawings.

The device is composed of a hexagon flange nut 1, a measuring column 2 and a detection sleeve 3, in which the hexagon flange nut 1 is matched with a threaded column 21; and the detection sleeve 3 is matched with a detection column 24.

The measuring column 2 includes the threaded column 21, a cone 22, a cylinder 23, the detection column 24 and a guiding cone 25; the threaded column 21 is on the left of the cone 22, the cylinder 23 is on the right of the cone 22, the detection column 24 is on the right of the cylinder 23, and the guiding cone 25 is on the right of the detection column 24.

The diameter of an inner hole of the detection sleeve 3 is $\Phi A$, and the tolerance is (0, +0.003) mm; and the runout of the outer conical surface relative to the central axis of the inner hole is 0.005 mm.

The diameter of the detection column 24 is $\Phi B$, $\Phi B = \Phi A - 0.3 + 0.036$) mm, and the tolerance is (0, −0.008) mm; the taper of the cone 22 is C, and the tolerance is ±3'; the coaxiality of the detection column 24 relative to the central axis of the cone 22 is 0.005 mm; and the taper of the guiding cone 25 is 25 degrees.

In the working process, the cone 22 of the measuring column 2 is matched with the cone hole of the detected workpiece, the hexagon flange nut 1 is matched with the threaded column 21 of the measuring column 2, and the measuring column 2 is fixed on the workpiece; the inner hole of the detection sleeve 3 is matched with the detection column 24, the conical surface of the detection sleeve 3 is in contact with the orifice of the $\Phi E$ hole in the workpiece, whether the whole conical surface is in uniform contact with the orifice of the $\Phi E$ hole is observed, and if in uniform contact, the detected coaxiality is qualified, otherwise, the detected coaxiality is unqualified.

The invention claimed is:

1. A coaxiality detecting tool for detecting a coaxiality of a straight hole in a detected workpiece relative to an axis of a cone hole, the coaxiality detecting tool comprising of a hexagon flange nut, a measuring column and a detection sleeve, wherein the measuring column comprises, in a direction from the hexagon flange nut to the detection sleeve, a threaded column, a cone, a cylinder, a detection column and a guiding cone;

wherein the coaxiality detecting tool is configured such that:

the cone of the measuring column is matched with the cone hole of the detected workpiece, the hexagon flange nut is matched with the threaded column of the measuring column, and the measuring column is fixed on the detected workpiece, an inner hole of the detection sleeve is matched with the detection column, and an outer conical surface of the detection sleeve is in contact with an orifice of the straight hole in the detected workpiece; when the outer conical surface of the detection sleeve is in uniform contact with the orifice of the straight hole, the coaxiality of the straight hole in the detected workpiece relative to the axis of the cone hole is qualified, otherwise, the coaxiality of the straight hole in the detected workpiece relative to the axis of the cone hole is unqualified.

2. The coaxiality detecting tool of claim 1, wherein a diameter of the inner hole of the detection sleeve is ΦA, and a tolerance of the diameter of the inner hole is (0, +0.003) mm; and a runout of the outer conical surface of the detection sleeve relative to a central axis of the inner hole is 0.005 mm.

3. The coaxiality detecting tool of claim 1, wherein a diameter of the detection column is (Φ)B, Φ=(Φ)A−0.3+0.036) mm, and a tolerance of the diameter of the detection column is (0, -0.008) mm; a taper of the cone is C, and a tolerance of the taper of the cone is ±3'; a coaxiality of the detection column relative to a central axis of the cone is 0.005 mm; and a taper of the guiding cone (25) is 25 degrees.

\* \* \* \* \*